May 14, 1968     C. R. MILLER     3,383,593

GATED PULSE MEASURING CIRCUIT HAVING REDUCED LEAKAGE CURRENT

Filed Oct. 16, 1964

INVENTOR.
CHARLES R. MILLER
BY
/ATTORNEY

United States Patent Office 3,383,593
Patented May 14, 1968

3,383,593
GATED PULSE MEASURING CIRCUIT HAVING REDUCED LEAKAGE CURRENT
Charles R. Miller, Garden City, N.Y., assignor to Sperry Rand Corporation, Great Neck, N.Y., a corporation of Delaware
Filed Oct. 16, 1964, Ser. No. 404,239
6 Claims. (Cl. 324—111)

ABSTRACT OF THE DISCLOSURE

A pulse measuring circuit in which a storage capacitor is charged through a transistor. The transistor is energized only during the occurrence of a gating signal and biased to the instep portion of the characteristic curve of the transistor.

---

The invention herein described was made in the course of or under a contract or subcontract thereunder, with the Department of the Air Force.

This invention relates to electrical measuring circuits and more particularly to circuits for measuring the amplitude of electrical pulses.

Circuits for measuring the amplitude of short-duration electrical pulses are well known in the art. These circuits usually operate on the principle that a storage capacitor can be charged by the unknown pulse and the voltage corresponding to the stored charged can be measured thereafter by any suitable means.

Such devices, however, require elaborate means to prevent leakage of the stored charge before the capacitor voltage is read.

Furthermore, many of the devices are nonlinear in the lower voltage region so that interpolation in these regions is difficult.

It is an object of the present invention to provide a device which does not require elaborate means to inhibit leakage from the storage capacitor.

It is another object of the present invention to provide a device which is linear throughout its operating region.

These and other objects are achieved according to the principles of the present invention by charging a storage capacitor through a transistor and by providing biasing means that effectively isolates the transistor during quiescent periods but drives it into a linear region during measurement periods so that both leakage and small signal discrimination are minimized.

Figure 1:
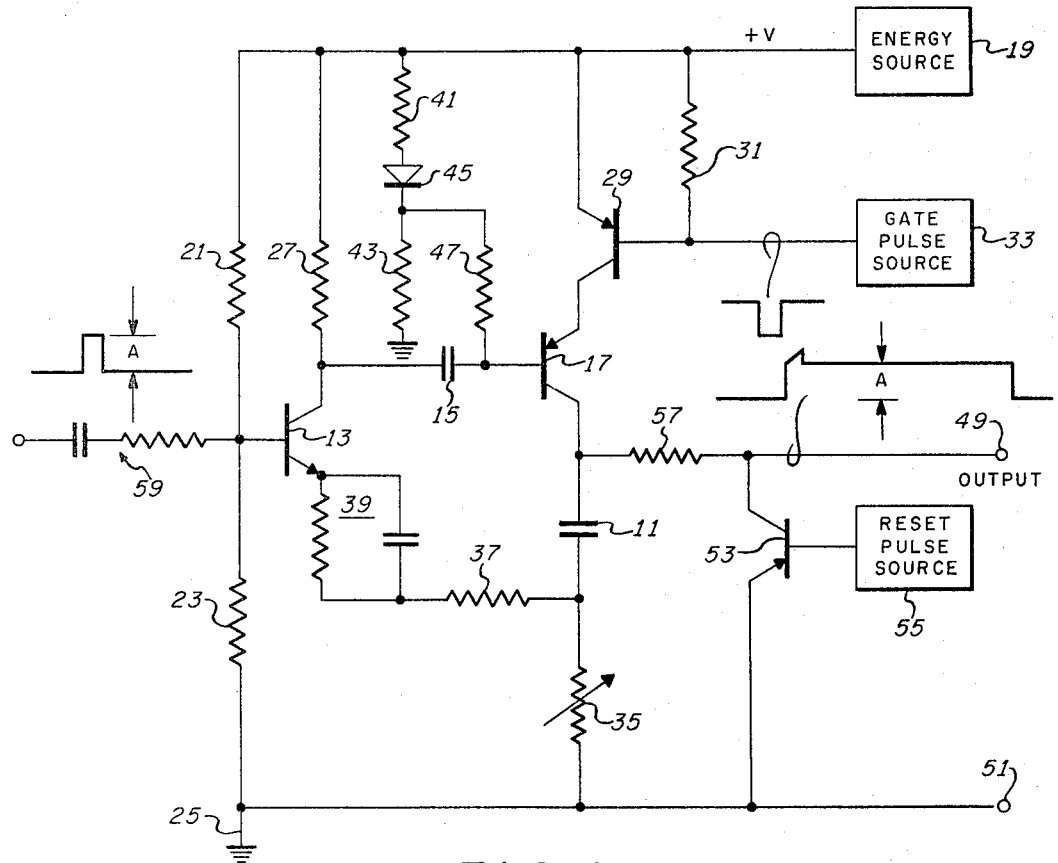
Figure 2:
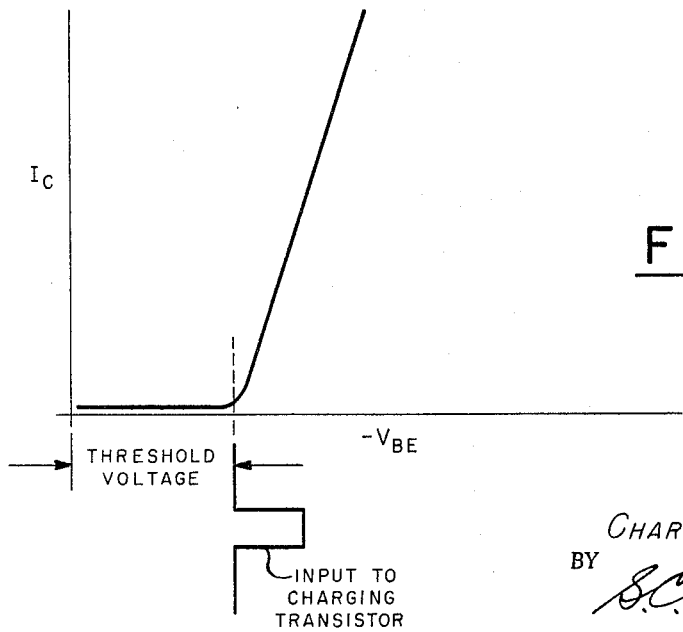

The principles and operation of the present invention can be understood by referring to the following description and the accompanying drawings in which:

FIG. 1 is a diagram representing a circuit employing the principles of the invention, and FIG. 2 is a graph useful in explaining the operation of the circuit of FIG. 1.

Referring now to FIG. 1, a storage capacitor 11 is used to store a charge indicative of the magnitude of the input pulse. In a practical circuit for measuring ten microsecond pulses, this capacitor has a value of 0.2 microfarad.

Input signals are applied to an input transistor 13. The signals from the input transistor are coupled through a coupling capacitor 15 to a charging transistor 17. These two transistors are complementary types as shown and may, for example, be 2N2222 and 2N2904 types, respectively. They function as the input and output transistors in a two stage amplifier. The circuit is energized from an energy source 19. A pair of resistors 21 and 23 are serially connected between the source 19 and a ground connection 25 so as to serve as a voltage divider which applies a suitable voltage to the base of the transistor 13. In the circuit mentioned previously, the resistor 21 has a value of 15,000 ohms and the resistor 23 has a value of 4700 ohms.

Energy from the source 19 is applied to the input transistor through a resistor 27. Energy from the source 19 is also applied to the charging transistor 17 through a gating transistor 29. This gating transistor may be of the same type as the charging transistor 17. The base of the transistor 29 is coupled to the energy source by means of a resistor 31. This resistor may typically have a value of 2000 ohms and serves to hold the gating transistor in a cut-off condition during quiescent periods. Negative-going gating pulses are applied to the base of the transistor 29 from a gate pulse source 33. These pulses have sufficient amplitude to drive the transistor 29 into saturation.

The storage capacitor 11 is connected to ground through a calibrating rheostat 35, which may typically have a maximum resistance of 100 ohms.

The voltage developed across the rheostat 35 is applied to the emitter of the transistor 13 through a feedback resistor 37 and a resistance-capacitance network 39. The feedback resistor 37 may have a value in the order of 100 ohms and serves to suppress spurious oscillations. The resistance and capacitance components in the network 39 may have a value of 47,000 ohms and 1 microfarad respectively. The values of these components may be determined by well-known techniques to achieve any desired amount of negative feedback.

The base of the charging transistor 17 is biased by means of a biasing circuit including first and second resistors 41 and 43, a solid state diode 45, and a resistor 47.

The operation of the biasing circuit may be understood by referring to FIG. 2 which represents the variation of collector current in a transistor when various base-to-emitter voltages are applied. As the voltage is increased from zero, essentially no current flows until a threshold voltage is reached. At this voltage, the characteristic curve displays a sharp instep and the collector current increases rapidly and linearly beyond this point.

As indicated in FIG. 2, the magnitude of the threshold voltage is comparable to the magnitude of the smaller input pulses which may be encountered. Without the imposition of such a bias voltage, these pulses would be lost. With the bias voltage applied, however, these small magnitude pulses become measurable.

The bias circuit is adjusted so as to bias the charging transistor 17 to the threshold voltage when the gating transistor is saturated. The resistor 41 is chosen so as to provide a voltage drop equal to the voltage drop across the gating transistor 29 when that transistor is saturated. In the typical circuit previously described, this resistor has a value of 1000 ohms. The diode 45 provides a voltage drop approximating the base-to-emitter voltage drop in the charging transistor 17. A 1N914 diode has been found suitable for this purpose. The resistor 43 completes the voltage divider in the bias circuit. In the practical circuit previously described, this resistor has a value of 62,000 ohms.

The resistors 27 and 47 are chosen to have as high a resistance as is practical in order to minimize diversion of the pulse current from the base of the charging transistor.

Output signals are applied to a pair of terminals 49 and 51. After a measurement is made, the storage capacitor is discharged by means of a shorting switch. This switch may conveniently take the form of a discharging transistor 53 which can be driven to saturation by a reset pulse source 55. A discharge resistor 57 may be included in the circuit if desired. This resistor helps to buffer the measuring circuit from the influence of the external loads.

Input pulses may be applied through a resistance-capacitance network 59. Although the use of such a network is not mandatory, its use has been found to be advisable since it helps suppress spurious oscillations that may otherwise occur in the amplifier circuit. A positive-going rectangular pulse will produce an output signal as indicated in FIG. 1. The output signal includes an initial transient which exists concurrently with the input signal followed by a constant voltage plateau whose amplitude is proportional to the amplitude of the input signal. The amplitude of this plateau may be made equal to the amplitude of the input signal by the initial adjustment of the calibrating rheostat 35. In practical applications, the output signal may be sampled at any time after the termination of the gate pulse from the source 33.

In operation, the gating transistor 29 is normally maintained in a cut-off condition. This provides electrical isolation for the charging transistor 17, which in turn prevents leakage from the charging capacitor during quiescent periods.

When a pulse is to be measured, the gate pulse source is triggered so that the gating transistor saturates, thus effectively connecting the emitter of the charging transistor to the positive side of the energy source. Under these conditions, a bias voltage applied to the base of the charging transistor holds this transistor at the instep portion of its characteristic curve, so that any input signal will drive the transistor into its linear region.

Since the gating transistor is turned off completely during quiescent periods, the charging transistor can be electrically isolated so that it can have its base returned to a voltage which holds it almost "on." This prevents discrimination against low level input signals while at the same time providing the very low leakage current of a transistor that is completely cut off.

Although the circuit finds its greatest use in pulse amplitude measurement involving pulses of a known shape, it will be appreciated that the circuit may be used as a pulse integrator. With pulses of random shape, the gating means can be adjusted to provide a gating pulse having a duration equal to that of the pulse to be measured. Under these conditions, the level of the plateau of the output pulse will be equivalent to the time integral of the input pulse.

A particular circuit has been described, however it will be appreciated that various components were specified only to illustrate typical values that are being employed in a typical circuit. Many changes may be made in the circuit in order to provide operation under a variety of conditions.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A pulse measuring circuit comprising an amplifier; input means on said amplifier to receive pulses to be measured; a charging transistor in the output stage of said amplifier, said charging transistor having a characteristic such that substantially no output current will flow until at least a threshold voltage is applied to its input terminal; a source of energy; a source of gate pulses; gating means to connect the charging transistor to the source of energy only during the occurrence of a gate pulse from said source of gate pulses; bias means to supply a bias voltage to the input terminal of said charging transistor, said bias voltage having a magnitude such that the charging transistor is biased to the threshold voltage when the transistor is connected to said source of energy; a storage capacitor coupled to receive current from said source of energy through said charging transistor; output terminals on said storage capacitor; and reset means to discharge said capacitor.

2. A pulse measuring circuit comprising an amplifier; input means on said amplifier to receive pulses to be measured; a source of energy; a charging transistor in the output stage of said amplifier, said charging transistor having a characteristic such that substantially no collector current will flow until the base-to-emitter voltage exceeds a threshold voltage, said characteristic further having a sharp instep portion at said threshold; a gate pulse source to provide gating pulses during measurement intervals; gating means to connect the emitter of said charging transistor to the source of energy only during the occurrence of a gate pulse; bias means to supply a bias voltage to the base electrode of said charging transistor, said bias voltage having a magnitude equal to the threshold voltage; storage capacitor means responsive to the output of the storage transistor, output terminals coupled to said capacitor; and reset means to discharge said capacitor.

3. A pulse measuring circuit comprising an amplifier; a source of energy; input means on said amplifier to receive pulses to be measured; a charging transistor in the output stage of said amplifier, said charging transistor having a characteristic curve displaying a sharp instep so that substantially no collector current will flow until the base-to-emitter voltage exceeds a threshold value corresponding to said instep and so that the magnitude of the collector current is a substantially linear function of base-to-emitter voltages in excess of the threshold voltage; a gate pulse source to provide gating pulses during measurement intervals; gating means to connect the emitter of said charging transistor to the source of energy only during the occurrence of a gate pulse; bias means to supply a bias voltage to the base electrode of said charging transistor, said bias voltage having a magnitude equal to the threshold voltage; storage capacitor means responsive to the output of the storage transistor, output terminals coupled to said capacitor; and reset means to discharge the capacitor.

4. A pulse measuring circuit comprising a transistor amplifier; an input transistor in said amplifier coupled to receive the input pulses to be measured; a source of energy; a charging transistor coupled to respond to signals from said input transistor, said charging transistor having an $I_c$—$V_{BE}$ characteristic curve including a sharp instep portion, said curve further having a value of $I_c$ which is essentially zero below said instep and rapidly rises above said instep; a storage capacitor in the output circuit of said charging transistor; current feedback means to couple a negative feedback signal indicative of the charging current supplied to said storage capacitor back to said input transistor; a gating transistor to interrupt the flow of forward current to the charging transistor from the energy source except during those intervals when an input pulse is to be received; means to drive said gating transistor to saturation during the time that an input is to be received; means to bias the charging transistor to the instep of its $I_c$—$V_{BE}$ curve when the gating transistor is in the conducting state; means to connect an external voltage indicating means across the storage capacitor; and means to discharge the storage capacitor when the measuring circuit is to be reset.

5. A pulse measuring circuit comprising a negative feedback amplifier; a source of energy; an input transistor in said amplifier coupled to receive the input pulses to be measured; a charging transistor in said amplifier coupled to receive signals from said input transistor, said charging transistor having a characteristic such that no substantial collector current will flow until the base-to-emitter voltage exceeds a threshold value, said characteristic further having a sharp instep portion at said threshold; a storage capacitor connected in series with the collector terminal of said charging transistor; a negative feedback loop in said amplifier connected to modify the gain of the amplifier in response to the instantaneous charging current applied to said storage capacitor; a gating transistor connected in series with the emitter of said charging transistor; and said energy source means to drive said gating transistor to saturation during the time that an input pulse is to be received; means to bias the base electrode of the charging transistor to the threshold voltage when the gating transistor is conductive; reset means to discharge the storage capacitor before a new input pulse is received; and output terminals to connect an external indicator to the pulse measuring circuit.

6. A pulse measuring circuit for measuring pulses in excess of a predetermined minimum amplitude comprising:
   (a) a source of energy;
   (b) a negative feedback amplifier;
   (c) an NPN input transistor in said amplifier coupled to receive the input pulses to be measured;
   (d) a PNP charging transistor having its base coupled to receive the output of said input transistor;
   (e) a storage capacitor connected to receive current from the collector terminal of said charging transistor;
   (f) negative feedback means in said amplifier responsive to the current flowing to said capacitor;
   (g) gating means for connecting the emitter of said charging transistor to the source of energy whenever an input pulse is being received;
   (h) bias means to return the base of the charging transistor to a voltage just sufficient to prevent conduction in this transistor when a minimum amplitude input pulse is applied to the circuit; said bias means including:
      (1) a first resistor connected to the source of energy, said first resistor having a value such that the bias current causes a voltage drop substantially equal to the drop occurring across the gating means during a measurement;
      (2) a solid state diode connected to said first resistor, said diode having a voltage drop approximately equal to the base-to-emitter drop of said charging transistor;
      (3) a second resistor connected between the diode and ground;
      (4) means to couple the base of the charging transistor to the junction between the diode and the second resistor;
   (i) output means to couple an external indicator accross the storage capacitor; and
   (j) reset means to discharge the storage capacitor.

References Cited

UNITED STATES PATENTS

| | | | |
|---|---|---|---|
| 2,621,263 | 12/1952 | Scoles | 328—53 |
| 2,695,954 | 11/1954 | Trousdale | 329—109 |
| 2,719,225 | 9/1955 | Morris | 324—111 |
| 3,105,196 | 9/1963 | Lerner | 330—18 XR |
| 3,160,707 | 12/1964 | Meyers | 330—18 XR |
| 3,197,709 | 7/1965 | Antonis et al. | 307—88.5 |
| 3,222,608 | 12/1965 | Chick | 330—18 XR |

RUDOLPH V. ROLINEC, *Primary Examiner.*

E. F. KARLSEN, *Assistant Examiner.*